(12) United States Patent
Jensen et al.

(10) Patent No.: US 9,932,081 B2
(45) Date of Patent: Apr. 3, 2018

(54) COMPOSITE FIBER SADDLEBAG, SADDLE BAG LINER, AND METHOD

(71) Applicants: Milsco Manufacturing Company, A Unit of Jason Incorporated, Milwaukee, WI (US); Janesville Acoustics, A Unit of Jason Incorporated, Southfield, MI (US)

(72) Inventors: Robert P. Jensen, Thiensville, WI (US); Michael J. Camella, Huron, OH (US); Michael Hynes, Burlington, WI (US)

(73) Assignees: Milsco Manufacturing Company, A Unit of Jason Incorporated, Milwaukee, WI (US); Janesville Acoustics, A Unit of Jason Incorporated, Southfield, MI (US)

( * ) Notice: Subject to any disclaimer, the term of this patent is extended or adjusted under 35 U.S.C. 154(b) by 270 days.

(21) Appl. No.: 14/562,348

(22) Filed: Dec. 5, 2014

(65) Prior Publication Data

US 2015/0158539 A1  Jun. 11, 2015

Related U.S. Application Data

(60) Provisional application No. 61/912,542, filed on Dec. 5, 2013.

(51) Int. Cl.
*B62J 9/00* (2006.01)
(52) U.S. Cl.
CPC ..................... *B62J 9/00* (2013.01)

(58) Field of Classification Search
CPC .. B62J 9/00; B62J 9/001; A45C 13/36; A45C 13/10; B32B 5/08
USPC ........................................................ 224/413
See application file for complete search history.

(56) References Cited

U.S. PATENT DOCUMENTS

| 3,903,944 | A | * | 9/1975 | Montgomery | A45C 3/00 |
| | | | | | 224/417 |
| 4,442,960 | A | | 4/1984 | Vetter | |
| D278,225 | S | | 4/1985 | Heiman et al. | |
| 4,629,040 | A | * | 12/1986 | Jones | A45C 3/001 |
| | | | | | 190/102 |

(Continued)

FOREIGN PATENT DOCUMENTS

EP  2 501 254  9/2012

*Primary Examiner* — Corey Skurdal
(74) *Attorney, Agent, or Firm* — Boyle Fredrickson S.C.

(57) ABSTRACT

A saddlebag container has a tub made of a plurality of composite fiber panels three dimensionally thermally molded or thermoformed in a chill forming process to form at least a plurality of structurally supporting tub walls and can have a lid of such construction. A preferred tub is formed of a plurality of panels with one panel three dimensionally shaped to form one sidewall and at least one of an endwall and bottom wall and another panel three dimensionally shaped to form the other sidewall that serves as a base to which the one panel is attached which can also provide a vehicle attachment mount. A preferred lid is formed of a panel that can have an outwardly extending mounting flap used to attach the lid to the base which can also serve as a hinge of the lid. A preferred tub and lid construction has at least two layers with one layer of a fibrous material and another layer of a different material that can provide a cover.

30 Claims, 3 Drawing Sheets

(56) References Cited

U.S. PATENT DOCUMENTS

| | | | |
|---|---|---|---|
| 5,743,979 A | 4/1998 | Lorbiecki | |
| 6,068,095 A * | 5/2000 | Glembocki | A45C 13/36 150/130 |
| 6,109,404 A * | 8/2000 | Bishop | A45C 5/14 190/115 |
| 6,120,630 A | 9/2000 | Lorbiecki | |
| 6,223,960 B1 * | 5/2001 | Powell | B62J 9/00 190/125 |
| 6,505,765 B1 | 1/2003 | Proctor et al. | |
| 6,604,750 B2 | 8/2003 | Malassigne et al. | |
| 6,623,022 B2 | 9/2003 | Malassigne et al. | |
| D497,341 S | 10/2004 | Hanagan | |
| 6,832,710 B2 | 12/2004 | Galbraith et al. | |
| D606,910 S | 12/2009 | Malassigne et al. | |
| 7,690,057 B2 | 4/2010 | Malassigne et al. | |
| 8,418,806 B1 | 4/2013 | Wyerman et al. | |
| 8,540,830 B2 | 9/2013 | Brentrup et al. | |
| 8,608,039 B2 | 12/2013 | Kaczowski et al. | |
| 8,925,778 B1 * | 1/2015 | Gordon | B62J 9/00 224/413 |
| 2002/0032253 A1 | 3/2002 | Lorenz et al. | |
| 2003/0010798 A1 | 1/2003 | Galbraith et al. | |
| 2003/0183668 A1 | 10/2003 | Hancock et al. | |
| 2004/0149792 A1 | 8/2004 | Akita et al. | |
| 2004/0164113 A1 * | 8/2004 | Thomas | B62J 9/00 224/413 |
| 2005/0121482 A1 * | 6/2005 | Zickefoose | B62J 11/00 224/413 |
| 2006/0163302 A1 | 7/2006 | Knoch et al. | |
| 2008/0083801 A1 | 4/2008 | Knoch et al. | |
| 2011/0182532 A1 * | 7/2011 | Baltus | A45C 3/001 383/109 |

* cited by examiner

COMPOSITE FIBER SADDLEBAG, SADDLE BAG LINER, AND METHOD

CROSS REFERENCE

Pursuant to 35 U.S.C. § 119(e), this application claims all benefits to and priority in U.S. Provisional Application Ser. No. 61/912,542, filed on Dec. 5, 2013, the entirety of which is hereby expressly incorporated by reference herein.

FIELD

The present invention is directed to a container and container liner of composite fiber construction and more particularly to a saddle bag and saddlebag liner construction for use on or with a vehicle, such as a motorcycle, including for holding one or more objects during vehicle operation.

BACKGROUND

Long ago, saddle bags for horses were made of leather. Later on, when saddle bags were adapted for use on vehicles, typically motorcycles, these saddlebags were also made of leather. Improvements to leather saddlebags include the use of metal and plastic supports that not only help reinforce the heavy leather bag or tub, but the supports also help keep its mouth or opening substantially open making them easier to use. While the virtues of leather saddlebags are well known, expensive material costs and rather costly manufacturing process have limited the use of leather to high end motorcycle saddle bags.

More recently, motorcycle saddlebags and other vehicle mounted containers have been blow-molded, injection molded or rotationally molded of cheaper and lighter weight plastic. To provide a decorative exterior, the plastic tub or bag can be wrapped with vinyl, a coated fabric, a decorative film, or even leather.

Even more recently, removable aftermarket saddlebag liners have been commercialized that are inserted into the plastic tub of each saddlebag to help prevent objects placed in the saddlebag from being scratched or scuffed by the plastic as well as to dampen the noise of the objects rattling around. Saddlebag liners can be formed to fit in the tub or can be made like a gym or duffel bag that zips closed and can be lifted to remove it from the tub of the saddlebag without removing any objects from it. Where formed to fit in the saddlebag tub, it can be made of a fabric, such as a woven fabric, a nylon, or the like, having a soft felt-like surface in contact with objects in the saddlebag to protect them and reduce noise. Where formed like a bag, bag-type saddlebag liners are typically made of nylon or a similar material that also helps protects objects in the bag but dampens sound less. While saddlebag liners have enjoyed some commercial success, they do reduce saddlebag storage capacity somewhat.

What is needed is a vehicle-mounted container construction that eliminates the need for a separate object-protecting and sound-dampening liner. As such, what also is needed is a vehicle-mounted container construction that dampens sound while protecting objects in container from scratches and scuffs. What further is needed is such a vehicle-mounted container construction that is well suited for use as a saddlebag. What is also needed is an improved container liner construction that is well suited for aftermarket and/or retrofit applications.

SUMMARY

The present invention is directed to a composite fiber container that preferably is a vehicle-mounted saddlebag formed of three dimensionally shaped structurally supporting fibrous material covered by an outer layer of a material different than the fibrous material forming an outer cover of the saddlebag. The composite fiber saddlebag has a tub constructed of at least one fibrous material panel three dimensionally shaped to form a plurality walls of the tub where the tub has a plurality of pairs, i.e., at least three, of walls, including a bottom wall, along with an opening through which one or more objects can be inserted into the tub. The at least one fibrous material panel of the tub can be covered by an outer layer of a material different than the fibrous material to form an outer cover of the tub. The saddlebag can include a lid that also can be constructed of at least one fibrous material panel three dimensionally shaped to define the lid. The at least one fibrous material panel of the lid can be covered by an outer layer of a material different than the fibrous material to form an outer cover of the lid.

In one embodiment of a tub of the saddlebag, the tub is constructed of a plurality of fibrous material panels having one of the plurality of fibrous material panels attached to another one of the plurality of fibrous material panels with the plurality of fibrous material panels three dimensionally shaped defining at least a plurality of a pair of spaced apart and opposed sidewalls and a pair of spaced apart and opposed end walls, and a bottom wall along with a mouth or opening overlying at least part of the bottom wall through which one or more objects can be stored in the tub. In one such embodiment, the tub is constructed of a plurality of fibrous material panels three dimensionally shaped to define at least a plurality of pairs of the tub walls including at least one of the tub sidewalls and at least one of the tub end walls. In another such preferred embodiment, the tub is constructed of a plurality of fibrous material panels three dimensionally shaped to define at least a plurality of pairs of the tub walls including at least one of the tub sidewalls and at least one of the tub end walls, and to define the bottom wall of the tub.

In one preferred embodiment, the tub is constructed of a plurality of fibrous material panels with one of the fibrous material panels three dimensionally shaped to form a plurality of walls of the tub and another one of the fibrous material panels three dimensionally shaped to form at least one other wall of the tub. In one such preferred embodiment, one of the three dimensionally shaped fibrous material panels forms the tub end walls and one of the tub sidewalls and another one of the three dimensionally shaped fibrous material panels forms the other one of the tub sidewalls. The another one of the three dimensionally shaped fibrous material panels defines a base to which the one of the three dimensionally shaped fibrous material panels is attached that can also form a vehicle attachment mount for attachment to a vehicle like a motorcycle, scooter or moped where the saddlebag is configured for vehicle attachment. The base preferably is more rigid than the panel attached to the base.

The tub can also include a base anchor panel that is attached the another one of the three dimensionally formed fibrous material panels and forms part of the base. Where the tub includes a base anchor panel, the base anchor panel can define the vehicle attachment mount. While the base anchor panel can also be formed of a composite fiber panel that can also be three dimensionally shaped, the base anchor panel can be made of a substantially rigid non-fibrous material like, metal or plastic.

The another one of the three dimensionally shaped fibrous material panels preferably defines an inner tub sidewall located adjacent to the vehicle to which the saddlebag is mounted such that the another one of the three dimensionally shaped fibrous material panels can be directly attached to the vehicle in mounting the saddlebag to the vehicle. In one preferred embodiment, the another one of the three dimensionally shaped fibrous material panels is three dimensionally shaped to form an elongate flange extending about part of an outer periphery of the tub sidewall. Where equipped with such a flange, the flange can be segmented and can extend about the outer periphery of a plurality of sides or side edges of the tub sidewall. Such a flanged tub sidewall not only can help structurally rigidify the tub sidewall but can also facilitate vehicle attachment. In one preferred embodiment, the flange extends along a bottom edge of the tub sidewall and preferably extends along a portion of one or both side edges of the tub sidewall. If desired, the flange can be continuous and uninterrupted but such a flange encompasses a flange formed of a plurality of pairs, i.e., at least three, spaced flange segments extending alongside and/or in line with one another.

Where the tub includes a separate base anchor panel, the base anchor panel can also have an elongate flange of complementary construction that registers with the flange of the tub sidewall during assembly functioning as locator flanges that locate the base anchor panel and tub sidewall relative to one another in preparation for attaching one to the other. In one preferred embodiment, the flanges of the base anchor panel and tub sidewall register with one another enabling nesting of the base anchor panel and tub sidewall such that the flanges extend alongside one another when the base anchor panel and tub sidewall are nested.

Where the saddlebag is equipped with a lid, the lid is formed of a fibrous material panel three dimensionally shaped to form the lid with the lid preferably attached to the tub by a hinge. In one lid embodiment, the lid is formed of a single fibrous material panel three dimensionally shaped to form at least a plurality of a plurality of walls and top of the lid. The three dimensionally shaped fibrous material panel can include an integrally formed hinge provided by an outwardly extending portion of the fibrous material panel that can also be used to mount the lid to the tub. In one preferred lid embodiment, the lid is formed of a single fibrous material panel three dimensionally shaped to form a plurality of walls of the lid as well as the top of the lid. In one such preferred lid embodiment, the lid is formed of a single fibrous material panel three dimensionally shaped to form a pair of lid sidewalls, a pair of lid end walls, and the top of the lid. In another such preferred lid embodiment, the lid is formed of a single fibrous material panel three dimensionally shaped to form a pair of lid sidewalls, a pair of lid end walls, and the top of the lid with the three dimensionally shaped fibrous material panel having an outwardly extending flexible mounting flap used to mount the lid to the tub which also can function as a living hinge.

In a preferred embodiment, the three dimensionally shaped fibrous material panels of the tub and/or lid define an inner liner formed of fibrous material that having a fibrous surface that provides an inner surface of the tub and/or lid that an object received in the saddlebag contacts during saddlebag use and operation. Such a soft fibrous inner tub and/or lid liner surface advantageously helps protect an object received in the saddlebag as it prevents object scratching and/or scuffing. Such a liner made of fibrous material advantageously reduces sound including by reducing the amount of sound produced by one or more objects moving around inside the saddlebag and/or by deadening sound by dampening and/or absorbing sound. Such a liner made of fibrous material also advantageously provides greater thermal insulation thereby helping to keep objects in the saddlebag cooler during summer and warmer during the winter.

A tub made of such a fibrous material liner also is more flexible and durable having greater toughness producing a saddlebag having greater crush resistance and which preferably also possess greater impact resistance. A tub made of such a fibrous material preferably possesses greater cold weather toughness, crush resistance and torsion strength producing a saddlebag better able to withstand cold temperatures. Tub made of such a fibrous material liner can advantageously produce a saddlebag having the flexibility, toughness, impact resistance and crush resistance of a conventional leather saddlebag while producing a saddlebag that is lighter and which costs less. These same properties, features and advantages also apply to a lid of such a saddlebag where the lid also includes such an inner liner made of fibrous material.

In a preferred saddlebag tub wall construction that is a composite fiber wall construction, the tub has a plurality of walls that includes at least one layer formed of fibrous material that preferably is a composite fiber and at least one other layer formed of a material different than the fibrous material that can be more flexible, water resistant, and denser than the fibrous material layer. In one such preferred wall construction, the fibrous material layer can be formed or provided by a three dimensionally shaped fibrous material panel and can form the tub liner with the at least one other layer disposed outwardly of the fibrous material layer. Where the at least one other layer is an outermost layer of the tub providing the tub with an outer cover, the other layer preferably is formed of a material that is more water resistant and denser than the fibrous material layer. Where equipped with a lid, the lid can also have such a multilayer composite fiber wall construction.

Where the tub has an outermost other layer providing an outer cover, the other layer can be made of leather, canvas, fabric, coated fabric, e.g., urethane coated fabric, vinyl, e.g., thermoformed vinyl, molded leather, upholstery, or another suitable flexible material different than the fibrous material. Where the other layer forms the outer cover, the other layer can be provided in the form of a cut-and-sew cover made of such a material. In another preferred outer cover embodiment, the other layer can be of spray on construction made of polyurethane, an epoxy or the like that is sprayed on and allowed to cure or harden to form the outer cover. In a further preferred outer cover embodiment, the other layer can be made of polyurethane, polyureas, polyisocyanurates, polyesters, polyphenols, polyepoxides, nylon, e.g. nylon 6, polycarbonate, acrylonitrile butadiene styrene (ABS), acetal, acrylic, epoxy, aluminum, polyester, polystyrene, and/or polybutylene molded around the three dimensionally shaped fibrous material panel(s) of the tub preferably using a mold and molding process preferably like reaction injection molding (RIM) or rotational molding.

The fibrous material of the fibrous material layer and three dimensionally shaped fibrous material panels preferably is formed composite fiber having at least one type of thermoplastic fiber, e.g., thermoplastic polymer resin fiber, used to produce a woven or non-woven fiber blend formed into a thermoplastically moldable composite fiber sheet that provides a composite fiber blank from which a fibrous material panel that preferably is a composite fiber panel is thermally molded into a desired three dimensional shape that is substantially retained after molding is done. The thermoplastic fiber blend can be made of polyethylene terephthalate (PET) fibers, polyolefin fibers, e.g. polyethylene and polypropylene fibers, polyamide fibers, polyester fibers, thermoplastic polyurethane fibers, polycarbonate fibers, and/or polyacetal fibers, as well as copolymers and blends thereof. The fiber blend can include one or more other types of fibers, including reinforcing fibers, such as glass fibers, carbon fibers, basalt fibers and/or aramid fibers, and/or natural fibers, such as flax fibers, jute fibers, hemp fibers, sisal fibers and/or cotton fibers blended with the thermoplastic fibers. One preferred fiber blend is made of one or more types of thermoplastic fibers blended or formed into a thermoplastically moldable composite fiber sheet that can and preferably does have a carpet surface that preferably is a needle punch carpet surface. If desired, one or more types of reinforcing fibers and/or one of more types of natural fibers can be blended with the thermoplastic fibers to produce a woven or non-woven blend formed into a thermoplastically moldable composite fiber sheet having a carpet surface that can and preferably does have a carpet surface that preferably is a needle punch carpet surface.

Such a thermoplastically moldable composite fiber sheet provides a blank from which a fibrous material panel that preferably is a composite fiber panel is three dimensionally shaped in carrying out a method of making a container that preferably is a tub of a saddlebag. In a method of three dimensionally molding a thermoplastically moldable composite fiber sheet into a three dimensionally shaped fibrous material panel, the sheet forms a blank that is thermally formed, e.g., thermoformed, by heating the blank to a temperature above which the blank becomes pliable in a heating step during which the blank is three dimensionally molded into a desired three dimensional shape in a thermal molding step before being cooled to a temperature far enough below the pliable temperature of the blank in a cooling step that fixes the shape memory of the three dimensionally shaped fibrous material panel causing the three dimensionally shaped fibrous material panel to substantially maintain its three dimensional molded shape thereafter. In a preferred three dimensionally shaped fibrous material panel molding method, a heating or heat-forming step is performed while the fibrous material blank is received in a mold heating the blank to a desirably high thermoplastically moldable composite fiber sheet or blank forming temperature of greater than 125° Fahrenheit to make the thermoplastically formable blank pliable enough to enable it to be three dimensionally formed through application of force and/or pressure in the mold. The heating step is performed before performing a subsequent cooling step that preferably is a chill-forming step used to fix the three dimensional shape of the resultant three dimensionally shaped fibrous material panel molded from the blank. During the chill-forming step, the three dimensionally shaped fibrous material panel molded from the blank is relatively rapidly cooled from the thermally moldable fiber sheet or blank forming temperature to a shape memory fixing temperature of less than 32° Fahrenheit in less than about one minute. If desired, the heating sub-step can be performed right up until and even during an initial portion of the chill-forming sub-step. The same method and method steps preferably are used to thermally mold such a blank to form a three dimensionally shaped fibrous material panel used to make the lid.

A saddlebag constructed in accordance with the present invention having at least a tub formed of such a fibrous material liner and preferably has both a tub and lid formed of a fibrous material liner provides a weight reduction of at least 10% as compared to conventional saddlebags having tubs formed of plastic and/or leather. A saddlebag constructed in accordance with the present invention having a tub formed of a fibrous material liner can carry a load equivalent to or greater than such conventional saddlebags while being more flexible but distorts or sags less than conventional saddlebags having tubs formed of plastic.

A saddlebag constructed in accordance with the present invention having at least a tub formed of a fibrous material liner can be formed with an inner tub surface that is a carpet surface that is softer than conventional saddlebags having tubs made of plastic protecting objects better while reducing saddlebag noise. One such saddlebag constructed in accordance with the present invention as at least a tub formed of a fibrous material liner having an inner tub surface that is a carpet surface that provides a class "A" interior surface inside the tub. Where equipped with a lid formed of such a fibrous material liner, the liner of the lid preferably has substantially the same carpet surface construction that preferably also provides a class "A" interior surface inside the lid. A saddlebag constructed in accordance with the present invention having at least a tub formed of such a fibrous material liner and preferably has both a tub and lid formed of a fibrous material liner where the fibrous material liner can be of water-resistant construction that preferably is substantially impervious to moisture, water and even other liquids.

Various other features, advantages and objects of the present invention will be made apparent from the following detailed description and the drawings.

DRAWING DESCRIPTION

One or more preferred exemplary embodiments of the invention are illustrated in the accompanying drawings in which like reference numerals represent like parts throughout and in which.

Figure 4:
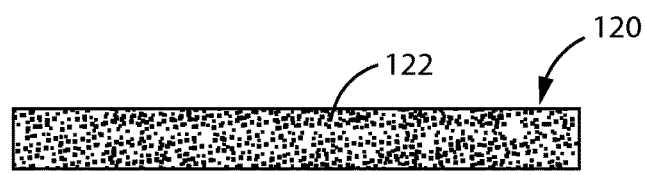
Figure 5:
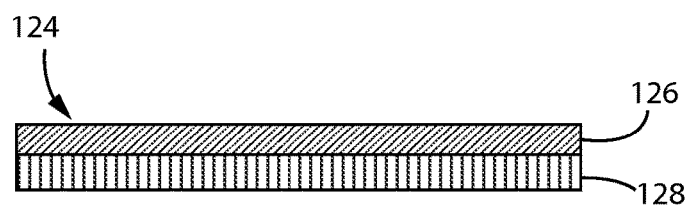

FIG. 4 is a perspective view of one preferred embodiment of a composite fiber sheet used as a blank thermally molded into a three dimensionally shaped panel used to make a composite saddlebag liner and tub or lid; and FIG. 5 is a perspective view of another preferred embodiment of a composite fiber sheet used as a blank thermally molded into a three dimensionally shaped panel used to make a composite saddlebag liner and tub or lid.

Before explaining one or more embodiments of the invention in detail, it is to be understood that the invention is not limited in its application to the details of construction and the arrangement of the components set forth in the following description and illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

Figure 1:
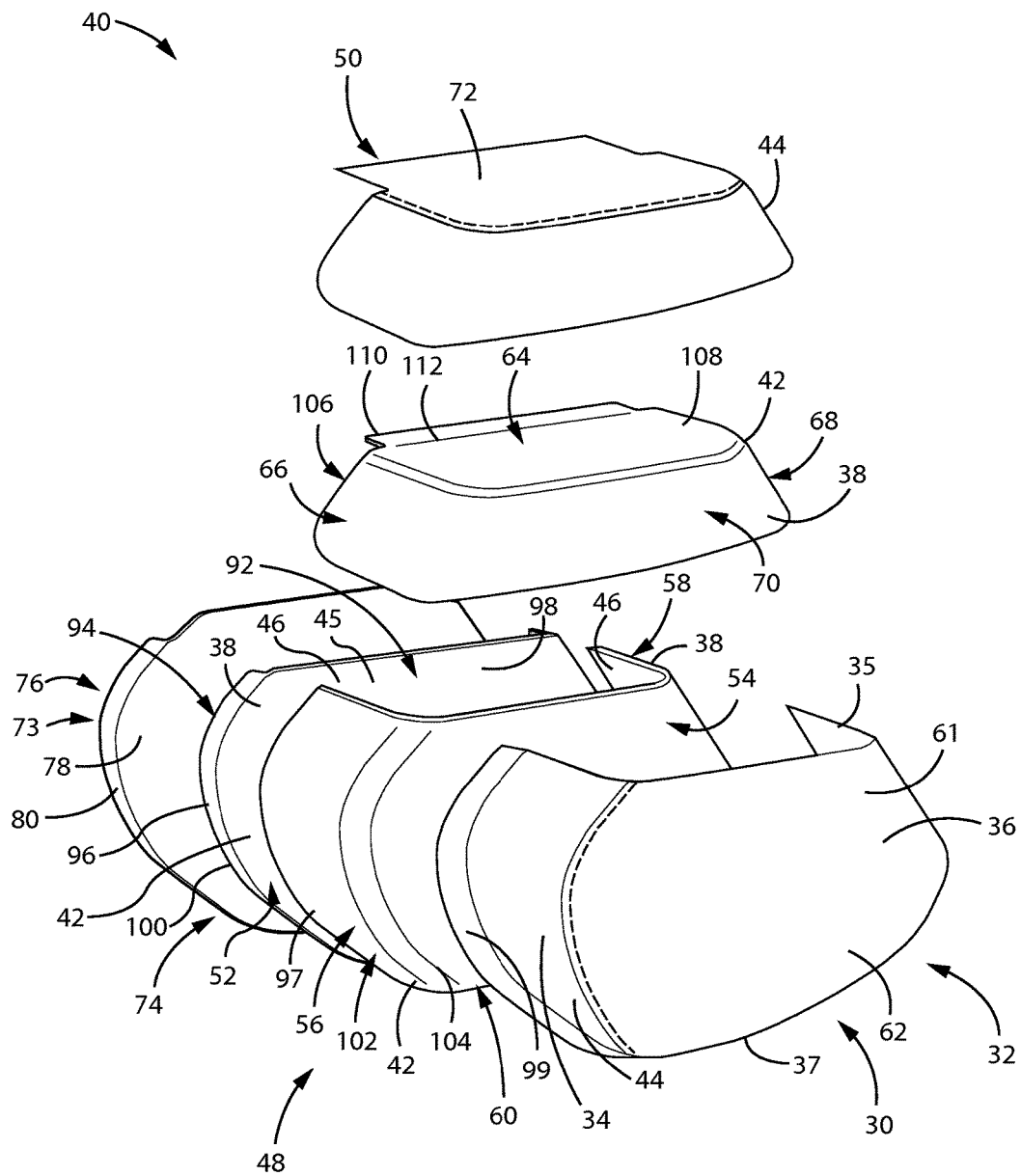
FIG. 1 is an exploded view of a composite fiber saddlebag assembly constructed in accordance with the present invention.
Figure 2:
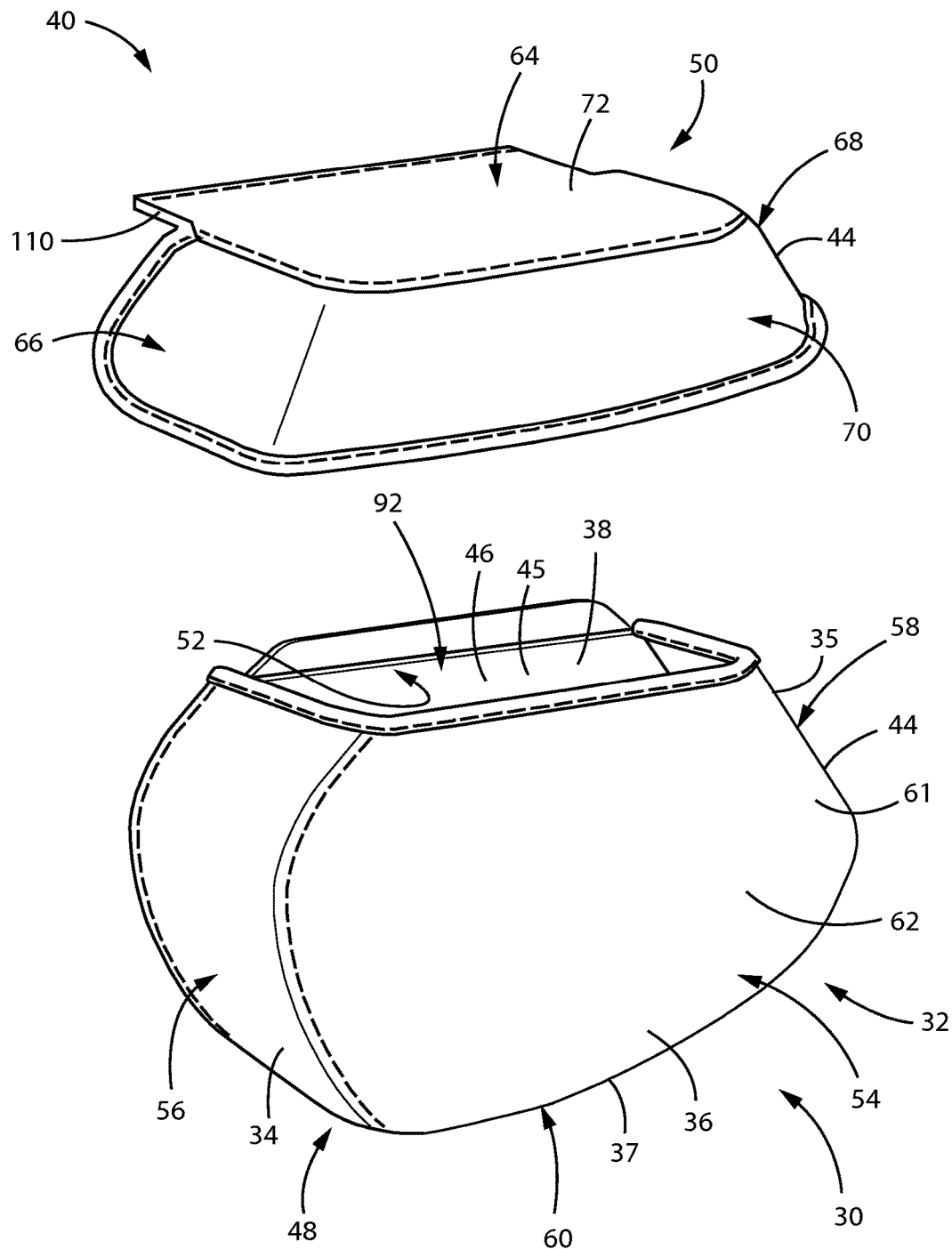
FIG. 2 is a perspective view of the saddlebag of FIG. 1 with a tub and lid of the saddlebag assembled but with the lid exploded from the tub.
Figure 3:
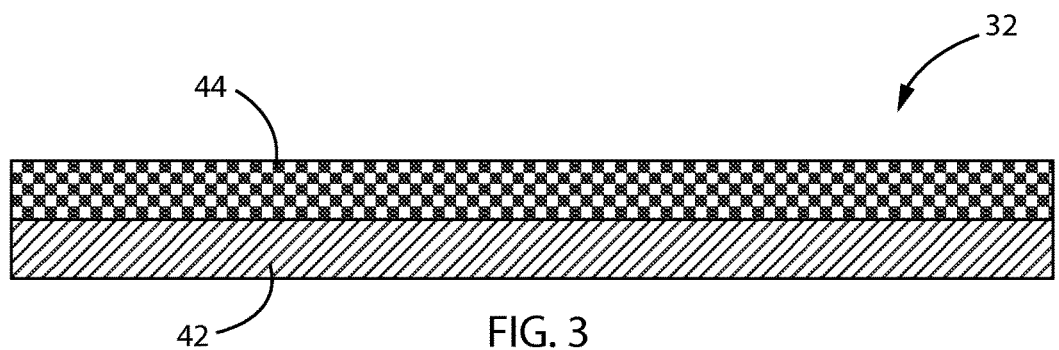
FIG. 3 is a cross section of a preferred embodiment of a wall section of the tub and lid.

FIGS. 1 and 2 illustrate an article or object holding composite fiber container 30 constructed in accordance with the present invention having a wall construction 32 best shown in FIG. 3 that is formed of at least one layer 42 of a fibrous material that preferably is a composite fiber with the fibrous material layer 42 preferably being three dimensionally shaped providing structural support to the container 30 thereby substantially helping to maintain the three dimensional shape of the container 30 during use and operation. A preferred container 30 for which at least one and preferably a plurality of walls 34, 35 and/or 36 having such a wall construction 32 with a three dimensionally formed structurally supporting fibrous material layer 42 is particularly well suited is a saddlebag 40 having a container 30 in the form of a tub 48 which can have a lid 50 removably attachable to the tub 48.

A preferred wall construction shown in FIG. 3 can and preferably does include at least one other layer 44 formed of a material different than the fibrous material layer 42 that can be more flexible or more compliant than the fibrous material layer 42. In one preferred wall construction, the other layer 44 can be disposed outwardly of the fibrous material layer 42 that can form an outer cover 62 of the tub 48 or outer cover 72 of the lid 50 where the other layer 44 is the outermost or exterior layer of the tub 48 or lid 50. As is shown in FIG. 3, one preferred wall construction 32 has one fibrous material layer 42 overlapped by one other material layer 44 producing a multilayer composite wall construction 32 that produces a container 30 of composite construction. Where the other layer 44 forms the outermost layer of the wall construction 32, the other layer 44 can be made of a material and/or configured with an outer surface that produces an aesthetically pleasing outer cover 62 and/or 72.

As discussed in more detail below, the fibrous material layer 42 can be provided by a panel of fibrous material formed from a blank of a moldable composite fiber sheet that is molded to three dimensionally form the blank into a three dimensionally shaped fibrous material panel that forms at least a portion of the container 30 preferably producing at least a plurality of walls 34, 35 and/or 36 of the container 30. As is also discussed in more detail below, a container 30 constructed in accordance with the present invention is formed of at least one such fibrous material panel three dimensionally shaped during molding forming at least a plurality of pairs, i.e., at least three, walls 34, 35 and 36 of the container 30. In one preferred container embodiment, the container 30 is formed of at least one such fibrous material panel three dimensionally shaped during molding forming at least a plurality of walls 34, 35 and/or 36 of the container 30 and a bottom 37 of the container 30.

As is discussed in more detail below, the three dimensionally shaped fibrous material panel can be made of a fiber mat or fibrous matting that can include a carpet surface and can be formed of a thermally formable carpet mat, carpeted sheet or another thermoplastically formable molded fiber sheet. Such a three dimensionally shaped fibrous material panel having at least one fibrous material layer 42 advantageously helps impart shape and structural rigidity to the container 30 while being more flexible, durable, tougher and/or impact resistant than conventional substantially "rigid" containers made with plastic walls. Such a fibrous material panel provides at least one fibrous material layer 42 that preferably helps produce a container 30 that is tougher, more impact resistant, and more flexible and which can be of sound reducing construction. The use of such a fibrous material panel having such a fibrous material layer 42 not only provides structural support to the container 30, but fibrous material layer 42 also produces a container 30 advantageously having load carrying capacities about the same or even greater than such conventional "rigid" containers without sagging or distorting any more than such conventional "rigid" containers when loaded despite being significantly more flexible.

The use of such a fibrous material layer 42 also functions to reduce sound transmission through the container 30 including by absorbing sound and/or blocking sound transmission. In a preferred container embodiment, overlapping layers 42, 44 work in concert with at least one of the layers 42 and/or 44 absorbing sound and at least one of the other layers 42 and/or 44 blocking sound transmission. In a preferred container embodiment, fibrous material layer 42 is a sound absorbing layer that absorbs sound produced within the container and outer layer 44 is a sound blocking layer that blocks sound transmission in either direction from or into the container 30. Where fibrous material layer 42 is made of multiple sub-layers that includes fibrous material attached to and/or sandwiched between a denser less porous substrate, fibrous material layer 42 can be and preferably is of both sound absorbing and sound blocking construction.

The use of such a fibrous material layer 42 also functions to reduce vibration transmission through the container 30 including by isolating vibration and/or absorbing vibration. In a preferred container embodiment, the overlapping of layers 42, 44 work in concert with at least one of the layers 42 and/or 44 isolating vibration and at least one of the other layers 42 and/or 44 absorbing vibration. In a preferred container embodiment, fibrous material layer 42 is a vibration absorbing layer that absorbs vibration transmitted to or through the container 30 and outer layer 44 is a vibration isolating layer that attenuates and/or blocks transmission of vibration in either direction to, through and/or from the container 30. In another preferred container embodiment, fibrous material layer 42 is a vibration isolating layer that isolates, attenuates and/or blocks vibration from being transmitted to or through the container 30 and outer layer 44 is a vibration absorbing layer that attenuates and/or blocks transmission of vibration in either direction to, through and/or from the container 30. Where fibrous material layer 42 is made of multiple sub-layers that includes a fibrous material attached to and/or sandwiched between a denser less porous substrate, fibrous material layer 42 can be and preferably is of both vibration absorbing and vibration isolating construction.

The use of such a fibrous material layer 42 also advantageously provides thermal insulation thereby thermally insulating objects in the container helping to keep objects in the container 30 warmer during cold weather and cooler during hot weather. The use of such a fibrous material layer 42 produces a container 30 having an insulation factor or R-value greater than the plastic from which such conventional "rigid" containers are made. In a preferred embodiment, a container 30 having walls formed of at least one fibrous material layer 42 and at least one other layer 44 preferably made of a flexible material different than the fibrous material layer 42 possess an insulation factor or R-value at least 25% greater than a conventional "rigid" container having walls of substantially the same thickness.

At least one preferred fibrous material layer 42 used in making a container 30 constructed in accordance with the present invention is compressible, preferably resiliently compressible, and which can also possess greater deformability, preferably also being resiliently deformable, than such conventional "rigid" containers while still maintaining the shape and sufficient structural rigidity of the container 30 advantageously produces a more flexible, durable, tougher and impact resistant container 30 even under cold weather conditions below freezing (i.e., below 32° Fahrenheit). At least one such preferred fibrous material layer 42 used in making such a container 30 is more compressible, preferably resiliently deformable, and possesses greater deformability, preferably resiliently deformable, than the plastic used to make conventional "rigid" plastic containers, with the fibrous material layer 42 being more compressible and/or deformable even at temperatures below zero (i.e., below 0° Fahrenheit).

The innermost layer of the container 30 can be made of a fibrous material layer 42 forming a composite fiber container liner 38 of relatively soft, object protecting, sound reducing and/or vibration dampening construction. Where the container 30 is made with a fibrous material layer 42 being the innermost layer, the innermost fibrous material layer 42 helps give shape and structural rigidity to the container 30 while providing an inner surface 46 of the container 30 that is softer than conventional "rigid" containers. A container 30 made with such a softer innermost fibrous material layer 42 advantageously provides better protection by reducing and preferably substantially completely preventing scratching and scuffing of objects inside the container 30. Where the innermost fibrous material layer 42 is of compressible and/or deformable fibrous construction, the innermost fibrous layer 42 can function as a cushion providing a cushioning container liner 38 that cushions objects in the container 30 impacting against the fibrous material layer 42 or liner 38.

While such a container 30 constructed in accordance with the invention is particularly well suited for being configured as a saddlebag 40 that is mounted, mountable, attached, or attachable to a wheeled vehicle like a motorcycle (not shown), container 30 can also be configured for use with other types of vehicles including mopeds, scooters, mobility scooters, all-terrain vehicles (ATVs), side-by-side vehicles (UTVs), lawn tractors, garden tractors, mini-excavators, excavators, front end loaders, skid steer vehicles, bulldozers, backhoes, tractors, combines, harvesters and the like. Such a container 30 constructed in accordance with the present invention also is well suited for use with even more types of vehicles, including marine vehicles, such as boats, personal watercraft, jet skis; tracked vehicles, including snowmobiles, as well as other types of vehicles.

Since a presently preferred embodiment of a container 30 constructed in accordance with the present invention is a saddlebag 40 configured for attachment to a wheeled vehicle, such as a motorcycle, scooter, moped, or the like, the rest of the detailed description of the present invention is directed to such a saddlebag 40 but also is applicable to containers 30 of the invention not intended for use as a motorcycle, scooter, or moped saddlebag. As such, the present invention is not intended to be limited to saddlebags 40 for use with motorcycles, scooters or mopeds.

With continued reference to FIGS. 1 and 2, a composite fiber saddlebag 40 constructed in accordance with the present invention having a wall construction formed of at least one fibrous material layer 42 and at least one other layer 44 that preferably is made of a flexible material different than the material of the fibrous material layer 42. The fibrous material layer 42 preferably provides greater structural support to the saddlebag 40 than layer 44 with layer 44 overlying and being supported by fibrous material layer 42 in at least one preferred saddlebag embodiment. In at least one saddlebag embodiment, layer 44 overlaps fibrous material layer 42. The fibrous material layer 42 not only provides structural support, but also produces a saddlebag 40 with load carrying capacities equivalent to or greater than conventional "rigid" saddlebags constructed of hard plastic walls but which also possesses greater flexibility, toughness and impact resistance. In at least one saddlebag embodiment, the fibrous material layer 42 not only gives shape and shape to the saddlebag 40, it produces a saddlebag 40 having the durability, strength, toughness, and resiliency of a conventional leather saddlebag while being less costly to make than a conventional leather saddlebag.

Where a fibrous material layer 42 is the innermost layer of the saddlebag 40, the innermost fibrous material layer 42 defines a liner 38 of the saddlebag 40 that provides an interior saddlebag surface 46 of scratch and scuff resistant construction, and which can also be of sound deadening and/or vibration absorbing construction. Such an innermost material fibrous layer 42 is advantageously relatively soft, especially when compared to relatively hard plastics from which conventional "rigid" saddlebags have been made in the past, thereby helping to prevent objects from becoming scratched or scuffed while inside the saddlebag 40. Such an innermost fibrous material layer 42 also can be and preferably is compressible and/or deformable thereby not only helping to protect any objects within the saddlebag 40 impacting against the innermost fibrous material layer 42 but which also helps reduce and preferably dampen the sound caused by objects moving around within the saddlebag 40.

Where compressible, fibrous material layer 42 preferably is resiliently compressible such that objects impacting against the fibrous material layer 42 and/or resting against or on the fibrous layer 42 will not leave a permanent indentation or impression in the surface 46 of the fibrous material layer 42 coming into contact with the object or objects. Where deformable, fibrous material layer 42 preferably is resiliently deformable such that impact, bending, twisting and/or crushing forces encountered by a composite fiber saddlebag 40 constructed in accordance with the present invention that would ordinarily plastically deform, tear, crack, shatter, break or otherwise destroy conventional "rigid" saddlebags advantageously only temporarily bends or deforms one or more portions of the saddlebag 40 without destroying the saddlebag.

In a preferred saddlebag embodiment, fibrous material layer 42 is more compressible, more deformable, tougher, more flexible and/or more resilient than the plastic used to make conventional "rigid" saddlebags producing a composite fiber saddlebag 40 constructed in accordance with the invention having at least one of the following properties: (a) at least 10% greater saddlebag crush strength than such a conventional "rigid" saddlebag, (b) at least 10% greater saddlebag torsion strength than such a conventional "rigid" saddlebag, (c) at least 10% greater saddlebag tear resistance than such a conventional "rigid" saddlebag, and/or (d) at least 10% greater saddlebag impact strength than such a conventional "rigid" saddlebag. In another preferred saddlebag embodiment, fibrous material layer 42 is much more compressible, more deformable, tougher, more flexible and/or more resilient than the plastic used to make conventional "rigid" saddlebags producing a saddlebag 40 constructed in accordance with the invention having at least one of the following properties: (a) at least 25% greater saddlebag crush strength than such a conventional "rigid" saddlebag, (b) at least 25% greater saddlebag torsion strength than such a conventional "rigid" saddlebag, (c) at least 25% greater saddlebag tear resistance than such a conventional "rigid" saddlebag, and/or (d) at least 25% greater saddlebag impact strength than such a conventional "rigid" saddlebag.

In a further preferred saddlebag embodiment, fibrous material layer 42 is significantly more flexible and tougher than the plastic used to make conventional "rigid" saddlebags producing a saddlebag 40 constructed in accordance with the invention possessing at least a plurality of the following properties: (a) at least 15% greater saddlebag crush strength than such a conventional "rigid" saddlebag, (b) at least 15% greater saddlebag torsion strength than such a conventional "rigid" saddlebag, (c) at least 15% greater saddlebag tear resistance than such a conventional "rigid" saddlebag, and/or (d) at least 15% greater saddlebag impact strength than such a conventional "rigid" saddlebag. In another preferred saddlebag embodiment, fibrous material layer 42 is far more flexible and tougher than the plastic used to make conventional "rigid" saddlebags producing a saddlebag 40 constructed in accordance with the invention possessing at least a plurality of the following properties: (a) at least 25% greater saddlebag crush strength than such a conventional "rigid" saddlebag, (b) at least 25% greater saddlebag torsion strength than such a conventional "rigid" saddlebag, (c) at least 25% greater saddlebag tear resistance than such a conventional "rigid" saddlebag, and/or (d) at least 25% greater saddlebag impact strength than such a conventional "rigid" saddlebag. In yet another preferred saddlebag embodiment, fibrous material layer 42 is much more flexible and tougher than the plastic used to make conventional "rigid" saddlebags producing a saddlebag 40 constructed in accordance with the invention possessing at a plurality of the following properties: (a) at least 35% greater saddlebag crush strength than such a conventional "rigid" saddlebag, (b) at least 35% greater saddlebag torsion strength than such a conventional "rigid" saddlebag, (c) at least 35% greater saddlebag tear resistance than such a conventional "rigid" saddlebag, and/or (d) at least 35% greater saddlebag impact strength than such a conventional "rigid" saddlebag. In a further preferred saddlebag embodiment, fibrous material layer 42 is much more flexible and tougher than the plastic used to make conventional "rigid" saddlebags producing a saddlebag 40 constructed in accordance with the invention possessing at a plurality of the following properties: (a) at least 50% greater saddlebag crush strength than such a conventional "rigid" saddlebag, (b) at least 50% greater saddlebag torsion strength than such a conventional "rigid" saddlebag, (c) at least 50% greater saddlebag tear resistance than such a conventional "rigid" saddlebag, and/or (d) at least 50% greater saddlebag impact strength than such a conventional "rigid" saddlebag.

With continued reference to FIGS. 1 and 2, a composite fiber saddlebag 40 constructed in accordance with the present invention has a tub 48 of composite fiber construction having an inner layer 42 formed of fibrous material, preferably composite fiber, and an outer layer 44 disposed outwardly of the inner fibrous material layer 42 that is made of a flexible material different than the fibrous material layer 42. A preferred composite fiber tub embodiment has at least one fibrous material layer 42 being the innermost layer of the tub 48 with the innermost fibrous material layer 42 having a softer fiber containing surface 45 arranged to form the interior surface 46 of the tub 48. One such preferred tub embodiment has at least one fibrous material layer 42 being the innermost layer of the tub 48 and at least one outer layer 44 being the outermost layer of the tub 48 that forms the outer surface 61 of the tub 48. Such a tub 48 having its innermost layer being a fibrous material layer 42 advantageously provides the tub 48 with a relatively soft scratch and scuff resistant interior surface 46 against which objects inside the saddlebag 40 can impact (and be cushioned during impact), rub against, slide along, rest on, etc. without damaging the objects and without the objects being scuffed or scratched by the tub 48. Such a tub 48 having an outermost layer 44 made of a flexible material different than the fibrous material layer 42 preferably has an outer surface that provides the tub 48 with an aesthetically pleasing outer surface 61.

A saddlebag 40 having a tub 48 with such an innermost fibrous material layer 42 is of noise deadening construction because objects moving around within the saddlebag 40 during use and operation cannot produce as much sound contacting one another and the inner surface 46 of the fibrous inner layer tub 48 as compared to a conventional "rigid" saddlebag. Such a saddlebag 40 having a tub 48 with such an innermost fibrous material layer 42 also is of noise reducing construction because any sound produced by objects moving around within the saddlebag 40 is absorbed and/or dampened. In addition, such a tub 48 also advantageously is of vibration isolating and/or vibration absorbing construction as discussed above with regard to container 30. Such a tub 48 preferably is also of thermally insulating construction possessing greater thermal insulation providing a greater insulation factor or R-value than conventional "rigid" saddlebags having substantially the same wall thickness.

As is best shown by FIG. 1, the tub 48 has a plurality of pairs, i.e., at least three, of walls 52, 54, 56, 58 and 60 with wall 52 being an inner tub sidewall, wall 54 being an outer tub sidewall spaced from the inner tub sidewall 52, wall 56 being a front tub end wall facing in a forward vehicle direction, wall 58 being a rear tub end wall facing in a rearward vehicle direction, and wall 60 being a bottom wall of the tub 48. Inner tub sidewall 52 can be and preferably is generally parallel with outer tub sidewall 54 with the front and rear tub walls 56 and 58 spaced apart and opposed to one another being generally inline with one another forming with the bottom wall 60 a container 30 having an opening or mouth 92 disposed adjacent an upper or top portion of tub walls 52, 54, 56 and 58. Bottom tub wall 60 adjoins or interconnects the lower or bottom portions of tub walls 52, 54, 56 and 58 with the bottom wall 60 also preferably underlying the opening or mouth 92 of the tub 48.

In a preferred tub embodiment, at least a plurality of walls 54, 56, 58 and 60 of the tub 48, and preferably all of the walls 54, 56, 58 and 60 of the tub 48, are formed of at least a plurality of layers 42, 44 with an inner layer 42 formed of fibrous material and an outer layer 44 disposed outwardly of the inner fibrous material layer 42 that is made or otherwise composed of a flexible material different than the fibrous material layer 42 that can and preferably does impart a desirable decorative, upholstered, or aesthetic appearance to the exterior of the tub 48. At least one of the plurality of layers 42, 44 is a structural layer that provides substantial structural support to the tub 48 by substantially maintaining the three-dimensional shape or structure of the tub 48 during saddlebag use and operation. In at least one tub embodiment, fibrous material layer 42 is a structural layer that provides substantial structural support to the tub 48 by substantially maintaining the shape or structure of the tub 48. In at least one tub embodiment where fibrous material layer 42 is a structural layer, fibrous material layer 42 has a cross-sectional thickness greater than each other layer 44 of the tub 48 that is made or otherwise composed of a flexible material different than the fibrous material layer 42. In one such tub embodiment where fibrous material layer 42 is a structural layer, fibrous material layer 42 has a cross-sectional thickness greater than each other layer 44 of the tub 48 including where layer 44 is the outermost layer of the tub 48 that forms the outer surface 61 of the tub 48.

In at least one tub embodiment, at least one of the plurality of layers 42, 44 of at least a plurality of walls 54, 56, 58 and 60 of the tub 48 is a structural layer that provides structural support to the tub 48 by substantially maintaining the shape or structure of the tub 48 including by structurally rigidifying the tub 48 during use and operation. In one preferred tub embodiment, at least the fibrous material layer 42 of a plurality of walls 54, 56, 58 and 60 of the tub 48 is a structural layer that provides substantial structural support to the tub 48 by substantially maintaining the three dimensional shape of the tub 48. In one such preferred tub embodiment, at least the fibrous material layer 42 of each one of walls 54, 56, 58 and 60 is a structural layer that provides substantial structural support to the tub 48 by substantially maintaining the three dimensional shape of the tub 48. In another such preferred tub embodiment, a plurality of the layers 42 and 44 of at least a plurality of walls 54, 56, 58 and 60 are structural layers that work together with one another to provide structural support to the tub 48 with the fibrous material layer 42 providing a greater amount of structural support than layer 44. In still another such preferred tub embodiment, a plurality of the layers 42 and 44 of each one of walls 54, 56, 58 and 60 are structural layers that work together with one another to provide structural support to the tub 48 with the fibrous material layer 42 providing a greater amount of structural support than layer 44.

The saddlebag 40 also can and preferably does include a lid 50 that can also be of composite fiber construction having an inner layer 42 formed of fibrous material and an outer layer 44 disposed outwardly of the inner fibrous material layer 42 that is made or otherwise composed of a flexible material different than the fibrous material layer 42. A preferred composite fiber lid embodiment has at least one fibrous material layer 42 being the innermost layer of the lid 50 with the innermost fibrous material layer 42 having a softer fiber containing surface 45 arranged to form the interior surface 46 of the lid 50. One such preferred lid embodiment has at least one fibrous material layer 42 being the innermost layer of the lid 50 and at least one outer layer 44 being the outermost layer of the lid 50 that forms the outer surface 61 of the lid 50. Such a lid 50 having its innermost layer being a fibrous material layer 42 advantageously provides the lid 50 with a relatively soft scratch and scuff resistant interior surface 46 against which objects inside the saddlebag 40 can impact (and be cushioned during impact), rub against, slide along, rest on, etc. without damaging the objects and without the objects being scuffed or scratched by the lid 50. Such a lid 50 having an outermost layer 44 made of a flexible material different than the fibrous material layer 42 preferably has an outer surface that provides the lid 50 with an aesthetically pleasing outer surface 61. As with the tub 48, fibrous material layer 42 provides sound deadening, vibration reduction, and/or thermal insulation as well as structural support to the lid 50.

The lid 50 has a plurality of pairs, i.e., at least three, of walls 64, 66, 68 and 70 with wall 64 being a top lid wall, wall 66 a front lid end wall facing in a forward vehicle direction, wall 68 being a rear lid end wall facing in a rearward vehicle direction, and wall 70 being a lid sidewall that preferably is an outer wall of the lid 50. In a preferred lid embodiment, at least a plurality of the walls 64, 66, 68 and 70 of the lid 50, and preferably all of the walls 64, 66, 68 and 70 of the lid 50, are formed of at least a plurality of layers 42, 44 with an inner layer 42 formed of the fibrous material and a layer 44 disposed outwardly of the inner fibrous material layer 42 that is made of a flexible material different than the fibrous material layer 42. In a preferred lid embodiment, the lid 50 is formed with layer 44 being an outermost layer with the outer surface of layer 44 providing an exterior surface 61 of the lid 50 that can be and preferably is of aesthetically pleasing appearance. In at least one preferred lid embodiment, at least a plurality of its walls 64, 66, 68 and 70 are formed having layers 42, 44 arranged the same as the tub 48. In at least one such preferred lid embodiment, each one of the walls 64, 66, 68 and 70 of the lid 50 are formed having layers 42, 44 arranged the same as the tub 48. Fibrous material layer 42 provides sound deadening, vibration reduction, and/or thermal insulation as well as structural support to the lid 50 in the same manner as for the tub 48.

In a preferred composite fiber saddlebag 40 constructed in accordance with the present invention, at least the tub 48 is of such a composite fiber construction having an inner layer 42 of composite fiber. In another preferred composite saddlebag construction, at least the lid 50 is of such a composite fiber construction having an inner layer 42 of composite fiber. In still another composite fiber saddlebag construction 40, both the tub 48 and the lid 50 are of such a composite fiber construction having an inner layer 42 of composite fiber construction.

The tub 48 preferably is mounted to a motorcycle, scooter, moped or another type of vehicle with its inner tub sidewall 52 facing toward the vehicle to which the tub 48 is mounted. The inner tub sidewall 52 preferably is made of at least one fibrous material layer 42 and need not have any other layer, including layer 44, to form a tub sidewall 52 that also serves as a base 74 to which one of more walls 56, 58 and/or 60 of the tub 48 are attached. Base 74 preferably is more rigid than the one or more walls 56, 58, and/or 60 attached to the base 74 and therefore preferably is more rigid than panel 102 that forms one or more of walls 56, 58, and/or 60 (and/or bottom wall). Where the saddlebag 40 has a lid 50, the lid 50 preferably also is attached to the base 74. The inner tub sidewall 52 can further serve as a saddlebag mount or vehicle attachment mount 76 used to attach the tub 48 of the saddlebag 40 to a vehicle.

The inner tub sidewall 52 is formed of a fibrous material layer 42 of a three dimensionally shaped fibrous material panel 100, preferably a composite fiber panel, which has a generally planar tub sidewall forming surface 98 from which an elongate flange 96 outwardly extends. Flange 96 extends outwardly away from the tub 48 toward the vehicle (not shown) to which the tub 48 is attached. Surface 98 preferably provides the tub 48 with a relatively soft inner surface 45 that can be compressible and which can be of carpeted construction.

Flange 96 extends outwardly along at least a portion of the outer periphery or outer peripheral edge of the tub sidewall forming surface 98, e.g., tub sidewall 52, preferably extending along at least one side thereof. In the preferred embodiment shown in FIG. 1, the flange 96 extends along a plurality of sides. As shown in FIG. 1, flange 96 extends along a bottom edge and a pair of side edges of the panel 100 stiffening, structurally rigidifying and thereby strengthening the tub sidewall 52. Preferably, the flange 96 strengthens the entire tub 48. Flange 96 can and preferably does serve as mounting flange to which one or more of the walls 56, 58 and/or 60 of the tub 48 are attached during tub assembly. In one preferred embodiment, a plurality of the walls 56, 58 and/or 60 are attached to the flange 96 during tub assembly. In one such preferred embodiment, each one of walls 56, 58 and 60 are attached to the flange 96 during tub assembly.

As is shown in FIG. 1, the tub 48 can include a base anchor panel 73 to which the panel 100 of the inner tub sidewall 52 can be fixed that can instead function as the vehicle attachment mount 76. Where the tub 48 is equipped with a base anchor panel 73, the base anchor panel 73 can function as the base 74 but preferably cooperates with the inner tub sidewall 52 together forming the base 74. Where the tub 48 includes a base anchor panel 73, the base anchor panel 73 helps strengthen, stiffen and structurally rigidify the inner tub sidewall 52 and preferably also does the same for the rest of the tub 48. Where the tub 48 has such a base anchor panel 73, it can also be formed of at least one fibrous material layer 42 and also need not be formed of any other layer. In one preferred base anchor panel embodiment, the base anchor panel 73 is formed of a substantially rigid material like metal or plastic with one preferred base anchor panel material being high density polyethylene (HDPE) that can be molded, e.g., injection molded, to form the panel 73. Such a panel 73 can be in the form of a plastic or metal plate if desired.

Where the tub 48 has a base anchor panel 73, the panel 73 has a tub interior facing surface 78 bounded by an elongate flange 80 extending outwardly therefrom that bounds at least a portion of the outer periphery or outer peripheral edge of the panel 73. Flange 80 extends outwardly away from the tub 48 toward the vehicle (not shown) to which the tub 48 is attached. Such a flange 80 preferably extends along one side of the panel 73 and preferably extends along a plurality of sides of the panel 73 as shown in FIG. 1. Flange 80 helps stiffen, strengthen and structurally rigidify the panel 73 thereby doing the same for the inner tub sidewall 52 and preferably also doing the same for the entire tub 48.

Flange 80 can and preferably also does serve as mounting flange to which one or more of the walls 52, 56, 58 and/or 60 of the tub 48 are attached during tub assembly. In one preferred embodiment, a plurality of the walls 52, 56, 58 and/or 60 are attached to the flange 80 during tub assembly. In one such preferred embodiment, each one of walls 52, 56, 58 and 60 are attached to the flange 80 during tub assembly.

Flange 80 also can serve as a locator, e.g., locator flange, for helping to locate the inner tub sidewall forming panel 100 during fixturing and/or attachment of the inner tub sidewall forming panel 100 to the base anchor panel 73. As is shown in FIG. 1, panels 73 and 100 are of nesting construction that nest with one another with their respective flanges 80 and 96 registering with one another such that one of the flanges 96 extends alongside and outwardly of the other one of the flanges 80 when nested. Flanges 80 and 96 can be configured to frictionally engage one another to help produce a self-fixturing nesting panel arrangement that can self-retain in the nested arrangement during fixing of the panels 73 and 100 to one another during assembly.

Panel 100 and/or panel 73 can include one or more mounting features (not shown), such as one or more flanges, tabs, fingers, snaps, posts, and/or retainers, and/or one or more openings (not shown), such as one or more holes, threaded bores, slots, channels, and/or grooves in providing a configuration that facilitates mounting of the saddlebag 40 to a vehicle (not shown). It is contemplated that at least a portion of each flange 96 and/or 80 can also be configured in a like manner with one or more such mounting features (not shown), and/or one of more such openings (not shown), to facilitate mounting of the saddlebag 40 to a vehicle (not shown). Such mounting features and/or openings, wherever located or formed on or of one or both panels 100 and/or 73, can also be configured or otherwise help enable or facilitate attachment of the tub 48 and/or the lid 50 during assembly of the saddlebag 40. Where the tub 48 lacks panel 73, panel 100 can be configured with any or even all of the above-discussed mounting features and/or openings.

A preferred saddlebag 40 constructed in accordance with the present invention is formed of a composite fiber tub 48 and/or composite fiber lid 50 that includes at least one layer 42 formed of a fibrous material that can be a woven or nonwoven fiber-containing material that is three-dimensionally formable when subjected to temperature, pressure and/or force in forming one or more composite fiber blanks 94, 102, and 106 into three dimensionally shaped fibrous material panels 100, 104, and 108 used to make the tub 48 and/or lid 50. Fibrous material layer 42 of each one of these panels 100, 104 and 108 can be and preferably is provided in the form of a thermoplastically moldable fiber-containing material having thermoplastic fibers, such as fibers formed of thermoplastic polymer resin, and can include reinforcing fibers, such as glass fiber, carbon fiber, aramid fiber, and/or basalt fiber, consolidated into a woven or non-woven blend to form a composite fiber sheet, e.g., sheet 120 or 124, of fibrous material used as a blank 94, 102 and/or 106 three-dimensionally formed when subjected to temperature, pressure and/or force into one or more components of the tub 48. In this manner, one or more of the walls 52, 54, 56, 58 and 60 of the tub 48 can be and preferably are formed, and/or one or more walls 64, 66, 68 and 70 of the lid 50 can be and preferably are formed.

In one preferred fibrous material embodiment, the fibrous material layer 42 includes a polymer resin that preferably is a thermoplastic polymer resin, which can include an ethylene, e.g., a polyethylene, and/or terephthalate, such as preferably polyethylene terephthalate (PET). One such preferred fibrous material includes molded fiber formed of PET that preferably is temperature stable and mildew resistant with the PET molded to form a synthetic PET blend producing a fibrous layer 42 having a fiber containing surface 45 formed of a needle punch carpet surface providing an inner tub and/or lid surface 46 that is of relatively soft, compliant or cushioning, and object-protecting construction. Such a needle punch carpet surface can be and preferably is formed of a synthetic PET blend. In one preferred fibrous material embodiment, the inner needle punch carpet surface is formed of PET, such as a PET blend, and is supported by a backing that also is formed of PET, which can be substantially completely formed of PET, but which also can be a PET blend if desired. As discussed in more detail below, such fibrous material provided in the form of a sheet or blank, e.g., sheet or blank 94, 102 and/or 106, is formed into the shape of at least a portion of the tub 48 and/or lid 50 by first heating the sheet or blank of fibrous material and thereafter chill-forming the sheet or blank of fibrous material into a fibrous material layer 42 having the desired three-dimensional shape or contour.

The fibrous layer 42 preferably has a thickness of at least 0.125 inches (about 3 mm) and preferably between 0.15 inches and 1.5 inches (or between about 3.75 mm and about 40 mm) such that the fibrous layer 42 not only prevents damage, scuffing or scratching of objects in the saddlebag 40, the fibrous layer 42 also dampens noise produced by objects moving around within the saddlebag 40. When formed, such as in the manner described herein, each formed fibrous material layer 42 of the tub 48 and/or lid 50 has a shape memory imparted to it that retains the desired formed tub-shape or lid-shape. When formed, the shape memory imparted to each fibrous material layer 42 of the tub 48 and/or lid 50 helps provide at least some structural rigidity and structural support to the saddlebag 40.

When formed, the thickness, composition, and/or construction of each fibrous material layer 42 of the tub 48 and/or lid 50 along with the shape memory imparted to each fibrous material layer 42 of the tub 48 and/or lid 50 produces a tub 48 and/or lid 50 possessing considerable crush resistance advantageously producing a crush resistant saddlebag 40. Such a saddlebag 40 constructed in accordance with the present invention advantageously has greater crush strength than a conventional "rigid" saddlebag whose walls are made of plastic. When formed, the thickness, composition, and/or construction of each fibrous material layer 42 of the tub 48 and/or lid 50 along with the shape memory imparted to each fibrous material layer 42 of the tub 48 and/or lid 50 also produces a tub 48 and/or lid 50 possessing considerable impact resistance advantageously producing a impact resistant saddlebag 40. Such a saddlebag 40 constructed in accordance with the present invention advantageously has greater impact strength than a conventional "rigid" saddlebag whose walls are made of plastic.

With reference to FIG. 4, each portion of the tub 48 and lid 50 having a fibrous material layer 42 can have at least its fibrous material layer 42 made from a thermoplastically moldable composite fiber sheet 120 formed of a single fiber-containing layer 122 that includes at least one type of fiber, such as a thermoplastic fiber, blended to form a non-woven fiber blend that can be thermally or mechanically consolidated, e.g., by needling, and compressed by molding to form the thermoplastically moldable composite fiber sheet 120 that can be used as blank 94, 102 and/or 106 which can then be molded as discussed elsewhere herein to respectively form three dimensionally shaped composite fiber panels 100, 104 and/or 108 that each have a three-dimensionally contoured fibrous material layer 42 in making a tub 48 and/or lid 50 of a composite saddlebag 40 constructed in accordance with the present invention.

In one such preferred composite fiber sheet 120, a plurality of different types of fibers are blended together to form the non-woven fiber blend, including one or more types of thermoplastic fibers. In addition to PET fibers, thermoplastic fibers suitable for use include polyolefin fibers, e.g. polyethylene and polypropylene fibers, polyamide fibers, polyester fibers, thermoplastic polyurethane fibers, polycarbonate fibers, and/or polyacetal fibers, as well as copolymers and blends thereof. Such a non-woven fiber blend can include reinforcing fibers if desired, including one or more of glass fibers, carbon fibers, basalt fibers and/or aramid fibers can be used. Such a non-woven blend can also include one or more types of natural fibers if desired, including one or more of flax fibers, jute fibers, hemp fibers, sisal fibers and/or cotton fibers. Exemplary but preferred thermoplastically moldable composite fiber sheet embodiments having at least one such fibrous layer 122 which are suitable for use as one or more of fibrous material blanks 94, 102 and/or 106 in making the tub 48 and/or lid 50 of the saddlebag 40 are disclosed U.S. Pat. No. 8,540,830, the entirety of which is expressly incorporated by reference herein.

With reference to FIG. 5, each portion of the tub 48 and lid 50 having a fibrous material layer 42 can have at least its fibrous material layer 42 made from another preferred thermoplastically moldable composite fiber sheet 124 that is of multilayer laminate construction formed of a plurality of sub-layers 126, 128 joined together with at least one of the layers 126 being of composite fiber construction and at least one other being a more rigid denser backing layer 128 that can also be of composite fiber construction. In one preferred multilayer laminate composite fiber sheet 124, one of the sub-layers 126 can be formed of carpet, such as composite fiber carpet formed of one or more thermoplastic fibers, which can be tufted or needled, such as a non-tufted and/or un-backed composite carpet, with another one of the sub-layers 128 being a composite fiber backer or backing layer made of an engineered fiber blend having one or more types of fibers including at least one fiber that is a thermoplastic fiber that can also include one or more reinforcing fibers and/or natural fibers. One or more exemplary but preferred embodiments of thermoplastically moldable composite fiber sheets that include at least sub-layers 126 and 128 suitable for use as one or more of composite fiber blanks 94, 102 and/or 106 used in making the tub 48 and/or lid 50 of the saddlebag 40 are disclosed in U.S. Pat. No. 8,418,806, the entirety of which is hereby expressly incorporated by reference herein.

Outwardly of the inner fibrous material layer 42 is another layer 44 made of a material different than the fibrous material of the inner fibrous layer 42. This other layer 44 is formed of a different material that is flexible that can also be thermally moldable which can help support the fibrous material layer 42 as well as help seal the fibrous material layer 42 from the elements outside of the saddlebag 40 particularly where layer 44 is of non-porous construction. This other layer 44 can also provide weather resistance such as by providing a water and/or moisture impervious barrier around the inner layer 42. This other layer 44 is attached to the inner fibrous layer 42, such as by being mechanically attached, such as by using rivets, fasteners, stitching, sewing, or the like, and/or by being bonded to the inner fibrous layer, such as by being adhesively glued, ultrasonically welded, thermally welded or the like. In the currently preferred saddlebag embodiment shown in FIGS. 1 and 2, the other layer 44 is the outer layer 44 of a two layer tub 48 and/or lid 50 with the outer layer providing an outer cover 62 for the tub 48 and/or an outer cover 72 for the lid 50.

In a method of making a container 30 that preferably is a saddlebag 40 constructed in accordance with the present invention, each one of a plurality of composite fiber blanks 94, 102 and 106, e.g. fibrous material sheet 120 and/or 124, are thermally molded in a thermal molding step that three-dimensionally shapes at least part of the blank using a thermal molded fiber forming process, which includes heat forming, chill forming, or a combination of heat forming and chill forming, to thermally mold the blank into a corresponding three-dimensionally contoured molded composite fiber panel 100, 104 and 108 each providing a fibrous material layer 42. In a preferred method of making such a container 30, e.g., saddlebag 40, each one of the composite fiber blanks 94, 102 and 106 is heated during a heat-forming sub-step to a molded fiber forming temperature above which the blank becomes pliable thereby enabling the blank to be three-dimensionally formed using force and/or pressure in a molding sub-step in a mold while being heated during the heat-forming sub-step before being cooled in a chill-forming sub-step to a molded shape fixing temperature that is below the temperature at which the blank becomes pliable causing the three-dimensional shape of the molded composite fiber panel 100, 104, or 108 to become fixed thereby fixing its shape memory substantially in its molded shape.

In carrying out the thermal molding step, the fibrous material blank 94, 102 or 106 is initially heated during the heat-forming sub-step to a desirably high molded fiber forming temperature greater than 125° Fahrenheit to make the thermoplastically formable blank pliable enough to enable it to be three dimensionally shaped through application of force and/or pressure such as by being three-dimensionally formed using a mold. The heating sub-step is performed before performing a subsequent chill-forming sub-step used to fix the three dimensional shape of the resultant three-dimensionally formed molded composite fiber panel 100, 104 or 108 into the corresponding shape shown in FIG. 1 thereby also fixing the shape memory of the panel so it retains substantially the same shape during saddlebag use and operation. During the chill-forming sub-step, the three dimensionally formed blank 94, 102 or 106 is relatively rapidly cooled from the molded fiber forming temperature to a shape memory fixing temperature of less than 32° Fahrenheit in less than about one minute. If desired, the heating sub-step can be performed right up until and even during an initial portion of the chill-forming sub-step.

In a method of making a container 30 that preferably is a saddlebag 40 constructed in accordance with the present invention, the tub 48 is constructed of a plurality of three-dimensionally thermally molded composite fiber panels 100 and 104 that include a fibrous material layer and serve as structurally supporting tub panels to which an outer layer 44 is subsequently attached. Where the tub 48 has a base anchor panel 73, a fibrous material blank substantially the same as blank 94, e.g., fibrous material sheet 120 and/or 124, which can be thicker than blank 94, can be thermally molded to three dimensionally form panel 73. Where the container 30, e.g., saddlebag 40, includes a lid 50, the lid 50 can be and preferably is constructed of one three-dimensionally thermally molded fiber panel 108 that has a fibrous material layer 42 and serves as a structurally supporting lid panel to which an outer layer 44 is subsequently attached.

In one container, e.g., saddlebag, molded fiber panel forming method, one tub forming step that is a first tub-sidewall forming sub-step, a fibrous material blank 94 is thermally molded using the aforementioned heat-forming and chill-forming thermal molded fiber forming process to thermally mold the blank 94 into a three-dimensionally shaped inner tub sidewall molded fiber panel 100 having a fibrous material layer 42 and an integrally formed flange 96 bounding at least a portion of a generally planar tub sidewall forming panel segment 98 that includes an inner surface 45 of relatively soft fibrous construction. Where there is a base anchor panel 73, the generally planar tub sidewall panel segment 98 of the inner tub sidewall molded fiber panel 100 overlaps the generally planar sidewall surface 78 of the base anchor panel 73 with respective flanges 80 and 96 overlapping one another nesting the panels 73 and 100. Flange 96 of inner tub sidewall molded fiber panel 100 can be a locator flange that mates or registers with the flange 80 of panel 73, helping to properly locate the panel 100 relative to the base 74 during tub assembly. Where the inner tub sidewall 52 is constructed with such a base anchor panel 73, the panel 73 can be from a fibrous material blank like blank 94 in a second tub sidewall forming sub-step that is performed substantially the same as above used to produce panel 100.

In another tub forming method step that is a tub body forming sub-step, a fibrous material blank 102 is thermally molded using the aforementioned heat-forming and chill-forming thermal molded fiber forming process to thermally mold the blank 102 into a three-dimensionally shaped tub body molded fiber panel 104 having a fibrous material layer 42 and at least a plurality of integrally formed (a) spaced apart opposed front and rear tub end walls 54 and 58, (b) outer tub sidewall 54, and (c) tub bottom 60. In one such preferred tub body forming sub-step, the fibrous material blank 102 is thermally molded using the aforementioned heat-forming and chill-forming thermal molded fiber forming process to thermally mold the blank 102 into a three-dimensionally shaped tub body molded fiber panel 104 having integrally formed (a) spaced apart opposed front and rear tub end walls 54 and 58, (b) outer tub sidewall 54, and (c) tub bottom 60.

Where the container 30, e.g., saddlebag 40, has a lid 50, a still further tub forming method step is a lid body forming sub-step in which a fibrous material blank 106 is thermally molded using the aforementioned heat-forming and chill-forming thermal molded fiber forming process to thermally mold the blank 106 into a three-dimensionally shaped lid body molded fiber panel 108 having a fibrous material layer 42 and at least a plurality of integrally formed (a) spaced apart opposed front and rear lid end walls 66 and 68, (b) lid sidewall 70, (c) lid top wall 64 and (d) lid mounting flap 110 that can include an integral hinge 112, e.g., living hinge. In one such preferred lid body forming sub-step, the fibrous material blank 106 is thermally molded using the aforementioned heat-forming and chill-forming thermal molded fiber forming process to thermally mold the blank 106 into a three-dimensionally shaped lid body molded fiber panel 108 having integrally formed (a) spaced apart opposed front and rear lid end walls 66 and 68, (b) lid sidewall 70, (c) lid top wall 64 and (d) lid mounting flap 110 with integral hinge 112.

In assembly of the container 30, e.g., saddlebag 40, the tub 48 and lid 50 can be assembled independently of each other such that the assembly method steps of the tub 48 and lid 50 can be performed in an order different than presented below. In other words, while the assembly method steps of the tub 48 are presented first before the assembly method steps of the lid 50, it should be understood that the lid 50 can be assembled first, substantially simultaneously as the tub 48, or after the tub 48 is assembled.

In assembling the tub 48, assembly steps include assembling the tub body panel 104 to the inner tub sidewall molded fiber panel 100 with outer layer 44 being an outermost layer forming an outer cover 62 of the tub 48 that preferably is fixed to the tub body panel 104 before the tub body panel 104 is attached to the inner tub sidewall panel 100. Where the tub 48 includes a base anchor panel 73, the inner tub sidewall panel 100 can be assembled to the panel 73 by maneuvering panel 100 relative to panel 73 until their respective flanges 80 and 96 register with one another nesting panels 73 and 100 in a nested arrangement before being fixed to one another.

During nesting, flanges 80 and 96 function as locators that facilitate nesting assembly. Where the panels 73 and 100 are configured so their flanges 80 and 96 frictionally engage one another during nesting assembly, frictional engagement therebetween can produce a self-fixturing nesting assembly arrangement that facilitates attachment of the panels 73 and 100. Otherwise, panel 100 can be fixtured to panel 73 using a fixture, e.g. clamping fixture, clips, clamps, fasteners, or the like to hold them in place.

Once fixtured, panel 100 can be fixed to panel 73 by bonding, e.g., adhesive bonding, thermal bonding or welding, ultrasonic welding, radio frequency welding, or the like, such as by mechanical attachment, e.g. via rivets, staples, clips, tabs, screws, bolts, or another type of fastener(s), and/or such as by using another means of attachment, including by sewing and/or stitching. When assembly of the panels 73 and 100 is finished, the inner tub sidewall panel segment 98 of panel 100 overlies the inner tub sidewall supporting surface 78 of panel 73 and the flange 96 of the panel 100 overlaps the corresponding flange 80 of panel 73.

The tub molded fiber panel 104 is attached to the inner tub sidewall molded fiber panel 100 by overlapping an anchor margin 97 extending along its inner edge with the flange 96 of panel 100 and fixing panel 104 to panel 100 along their region of overlap such as by bonding, e.g., adhesive bonding, thermal bonding or welding, ultrasonic welding, radio frequency welding, or the like, by mechanical attachment, e.g. via rivets, staples, clips, tabs, screws, bolts, or another type of fastener(s), and/or by using another means of attachment, including stitching and/or sewing. If desired, panel 104 and 100 can be fixtured with the anchor margin 97 of panel 104 overlapping flange 96 of panel 100 using one of the fixturing arrangements disclosed above before fixing panel 104 to panel 100 along their region of overlap.

Where the tub 48 includes a base anchor panel 73, tub body fixturing step and tub body fixing step can include fixturing panel 104 with its anchor margin 97 overlapping the flange 96 of panel 100 and the flange 80 of panel 73 before the panel 104 is fixed along its anchor margin 97 to both flanges 96 and 80. Fixing can be done by bonding, e.g., adhesive bonding, thermal bonding or welding, ultrasonic welding, radio frequency welding, or the like, by mechanical attachment, e.g. via rivets, staples, clips, tabs, screws, bolts, or another type of fastener(s), and/or by using another means of attachment, including stitching and/or sewing.

In attaching the outer layer 44 to the tub body molded fiber panel 104 to provide the tub 48 with an outer cover 62 in a tub cover forming step, the outer layer 44 and panel 104 can be fixtured, such as in the manner disclosed above, before being attached to the panel 104 by being fixed thereto such as by bonding, e.g., adhesive bonding, thermal bonding or welding, ultrasonic welding, radio frequency welding, or the like, by mechanical attachment, e.g. via rivets, staples, clips, tabs, screws, bolts, or another type of fastener(s), and/or by using another means of attachment, including stitching and/or sewing. In one preferred embodiment, outer layer 44 forming outer cover 62 of the tub 48 can be of cut-and-sew construction formed of a durable material that also has an aesthetically pleasing appearance that can have an upholstered cover look. Suitable materials from which the outer cover layer 44 can be made include a woven fabric, a non-woven fabric, upholstery, a synthetic fabric, a coated fabric of woven or non-woven construction, vinyl, canvas, leather or another suitable outer durable material that can be and preferably is of flexible construction. Depending on the type of material, material thickness and the like, the tub cover 62 can help structurally support the tub 48 and can also help provide tub crush resistance.

If desired, the outer cover layer 44 can be of spray-on construction formed of a layer of material, such as urethane, an epoxy, or the like, which is sprayed onto the tub body molded fiber panel 104 and allowed to solidify, harden or cure forming an outer cover 62 of the tub 48 of relatively durable, tough and water-tight construction. In another preferred outer cover layer embodiment, the outer cover layer 44 can be molded onto or around panel 104 using a suitable molding material that flows around and into the exterior surface of the panel 104 during molding which then solidifies, hardens or cures forming an outer cover 62 of relatively durable, tough and water-tight construction. Where the outer cover layer 44 is molded in place around panel 104 to form the outer cover 62 of the tub 48, polyurethane, polyureas, polyisocyanurates, polyesters, polyphenols, polyepoxides, epoxies, and/or nylon 6 can be reaction injected molded into and/or around panel 104. In another preferred outer cover molding method, polyurethane, polyethylene, polypropylene, nylon, polycarbonate, acrylonitrile butadiene styrene (ABS), acetal, acrylic, epoxy, aluminum, polyester, polystyrene, and/or polybutylene is rotationally molded around the tub body molded fiber panel 104 forming an outer cover 62 of the tub 48 of relatively durable, tough and water-tight construction. Outer cover layer 44 can also be sprayed on, molded around or otherwise applied to the lid body molded fiber panel 108 to form the outer cover 72 of the lid 50 as described above in this paragraph.

The outer cover layer 44 preferably also has an outer anchor margin 99 extending along its inner edge that overlaps anchor margin 97 of the tub body molded fiber panel 104 which in turn overlaps the flange 96 of the inner tub sidewall molded fiber panel 100. Where the tub 48 has an anchor base panel 73, the outer anchor margin 99 not only overlaps the anchor margin 97 of panel 104 and flange 96 of panel 100, margin 99 also overlaps flange 80 of panel 73. The outer cover layer 44 can be attached to the tub body molded fiber panel 104 before the panel 104 is attached to the inner tub sidewall molded fiber panel 100 but can be attached afterwards if desired. In a preferred embodiment, margin 97 and/or margin 99 extends beyond flanges 80 and/or 96 and attached, such as via adhesively, using fasteners, or the like to the side of panel 73 and/or panel 100 facing away from the tub 48 to the vehicle (not shown) to which the tub 48 is mounted.

If desired, the outer cover attachment step of attaching the outer cover layer 44 to panel 104 can also attach the outer cover layer 44 and panel 104 to panel 100 by stitching or sewing the outer cover layer 44 thereto. This can be done where the outer cover layer 44 used to form the outer cover 62 of the tub 48 is of cut-and-sew construction. In stitching or sewing the outer cover layer 44 to panel 104 along the anchor margin 97 of the panel 104, such stitching or sewing can extend through the anchor margin 97 of panel 104 into and even through flange 96 of panel 100. Where the tub 48 has an anchor base panel 73, such stitching or sewing attachment can also extend into and even through the flange 80 of panel 73 fixing outer cover layer 44 and panel 104 to panel 100 and panel 73 during the cover attachment step.

In assembling the lid 50, assembly steps include fixturing and attaching an outer cover layer 44 to the lid body molded fiber panel 108 to form the outer cover 72 of the lid 50 using a fixture arrangement like that disclosed above and attachments arrangements and/or methods like those disclosed above. In assembling the lid 50 to the tub 48, an integral mounting flap 110 extending outwardly from the lid body molded fiber panel 108 is fixed to part of the tub 48. In a preferred method of assembly and saddlebag embodiment, the mounting flap 110 is attached to part of the tub 48 at or adjacent the inner tub sidewall 52 preferably by being attached to an adjacent portion of the inner tub sidewall molded fiber panel 104 such as by bonding, e.g., adhesive bonding, thermal bonding or welding, ultrasonic welding, radio frequency welding, or the like, by mechanical attachment, e.g. via rivets, staples, clips, tabs, screws, bolts, or another type of fastener(s), and/or by using another means of attachment, including stitching and/or sewing. In one such preferred method and embodiment, the mounting flap 110 is attached in this manner to the base 74 of the inner tub sidewall 52, including where the base 74 is a separate component. When attached to the tub 48, mounting flap 110 functions as a hinge 112 that preferably is a living hinge enabling the lid 50 to be rotated away from the tub 48 when opening the container 30, e.g., saddlebag 40, and rotated toward the tub 48 when closing the container 30, e.g., saddlebag 40.

If desired, hinge 112 can be formed by compressing part of the flap 110 to form a V-shape in the flap 110 to create a hinge line or point about which the lid 50 folds and rotates during opening and closing of the container 30, e.g. saddlebag 40. If desired, the flap 110 can include or be formed with a plastic hinge 112 (not shown) that can be a plastic living hinge. If desired, the hinge 112 can also be formed of a pair of leafs (not shown) that are each attached to one or both of the tub 48 and lid 50 that can be configured with a detent that holds the lid 50 in an open position.

Understandably, the present invention has been described above in terms of one or more preferred embodiments and methods. It is recognized that various alternatives and modifications may be made to these embodiments and methods that are within the scope of the present invention. It is also to be understood that, although the foregoing description and drawings describe and illustrate in detail one or more preferred embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims.

It is claimed:

1. A motorcycle saddlebag comprised of a tub having three-dimensional shape with at least a portion of a body of the tub formed of a flexible and resilient three dimensionally shaped tub panel comprised of flexible and compressible fibrous material that imparts flexibility and resilience thereto, the fibrous material of the tub panel structurally supporting the three dimensional shape of the tub and sound dampening the tub.

2. The motorcycle saddlebag of claim 1, further comprising an outer layer of a material different than the fibrous material that is attached to the three dimensionally shaped tub panel.

3. The motorcycle saddlebag of claim 2, wherein the different material layer forms an outer cover of the tub.

4. The motorcycle saddlebag of claim 3, wherein the different material layer comprises a cut-and-sew outer cover.

5. The motorcycle saddlebag of claim 1, wherein the three dimensionally shaped fibrous material tub panel is comprised of a fibrous material layer comprised of thermoplastic fibers formed into the three dimensional shape of the three-dimensionally shaped fibrous material tub panel, the three dimensionally shaped fibrous material layer structurally supporting the tub by substantially maintaining the three dimensional shape of the tub.

6. The motorcycle saddlebag of claim 1, wherein the three dimensionally shaped fibrous material tub panel is comprised of a three dimensional shape memory fixed thermoplastically molded chill formed layer of fibrous material made of a thermoplastic fiber blend comprised of a plurality of different types of thermoplastic fibers.

7. The motorcycle saddlebag of claim 6, wherein the three dimensionally shaped fibrous material tub panel is comprised of carpet.

8. The motorcycle saddlebag of claim 1, wherein the three dimensionally shaped fibrous material tub panel is comprised of thermoplastic polymer fibers.

9. The motorcycle saddlebag of claim 1, wherein the three dimensionally shaped fibrous material tub panel comprises a pair of end walls of the tub and a sidewall of the tub that spaces apart the pair of end walls of the tub.

10. The motorcycle saddlebag of claim 1, wherein the three dimensionally shaped fibrous material tub panel comprises a pair of end walls of the tub, a sidewall of the tub, and a bottom of the tub.

11. The motorcycle saddlebag of claim 1, wherein the tub is comprised of (a) a first three dimensionally shaped fibrous material tub panel comprising a pair of spaced apart end walls and one sidewall of the tub, and (b) a second three dimensionally shaped fibrous material tub panel comprising an opposite sidewall of the tub spaced apart from the one sidewall of the tub.

12. The motorcycle saddlebag of claim 11, wherein the second three dimensionally shaped fibrous material tub panel comprises a base to which the first three dimensionally shaped fibrous material tub panel is attached.

13. The motorcycle saddlebag of claim 12, wherein the base comprises a vehicle attachment mount used to attach the tub to a vehicle.

14. The motorcycle saddlebag of claim 13, wherein the base is further comprised of a substantially rigid material different than the fibrous material.

15. The motorcycle saddlebag of claim 1, wherein the tub is comprised of (a) a first three dimensionally shaped fibrous material tub panel forming a pair of spaced apart end walls, one sidewall, and a bottom of the tub, the first three dimensionally shaped fibrous material tub panel formed of a structurally supporting three dimensionally shaped fibrous material layer made substantially completely of the fibrous material, and (b) a second three dimensionally shaped fibrous material tub panel forming an opposite sidewall of the tub spaced apart from the one sidewall of the tub, the second three dimensionally shaped fibrous material tub panel formed of a structurally supporting three dimensionally shaped fibrous material layer made substantially completely of the fibrous material, the second three-dimensionally shaped fibrous material tub panel comprising a base to which the first three dimensionally shaped tub panel is attached forming the tub.

16. The motorcycle saddlebag of claim 1, wherein the three dimensionally shaped fibrous material tub panel is formed of a thermoplastically moldable composite fiber sheet formed of a woven or non-woven fiber blend comprised of a plurality of different types of thermoplastic fibers.

17. The motorcycle saddlebag of claim 16, wherein the three dimensionally shaped fibrous material tub panel is comprised of a needle-punch carpet inner tub surface.

18. The motorcycle saddlebag of claim 1, further comprising a lid formed of a three dimensionally shaped lid panel comprised of fibrous material, the three dimensionally shaped fibrous material lid panel attached to the tub by a hinge formed of a lid mounting flap extending from the three dimensionally shaped fibrous material lid panel.

19. The motorcycle saddlebag of claim 1, wherein the three dimensionally shaped tub panel is formed of a thermally shaped and chill formed fibrous material layer formed substantially completely of the flexible and compressible fibrous material, the thermally shaped and chill formed fibrous material layer having a three dimensional shape providing structural support to the tub panel and tub.

20. The motorcycle saddlebag of claim 19, wherein the flexible and compressible fibrous material is formed of thermoplastic fibers.

21. The motorcycle saddlebag of claim 20, wherein the flexible and compressible fibrous material is formed of a plurality of different types of thermoplastic fibers adhered by a thermoplastic resin.

22. A motorcycle saddlebag comprised of a tub formed of at least one three-dimensionally shaped panel comprised of a three dimensionally formed fibrous material layer made substantially completely of a, fibrous material comprised of thermoplastic fibers defining a container having a plurality of spaced apart sidewalls, a bottom wall, and an opening through which an object can be placed therein, and wherein the three dimensionally formed fibrous material layer of the at least one three dimensionally shaped fibrous material panel structurally supports the tub by substantially maintaining the three dimensional shape of the tub.

23. The motorcycle saddlebag of claim 22, wherein the three dimensionally formed fibrous material layer comprises a sound reducing layer that provides sound dampening to the tub.

24. The motorcycle saddlebag of claim 22, wherein the at least one three dimensionally shaped fibrous material panel is comprised of a plurality of three dimensionally shaped fibrous material panels with one of the plurality of three dimensionally shaped fibrous material panels forming one of the plurality of sidewalls that comprises a base to which another one of the plurality of three dimensionally shaped fibrous material panels is attached in defining the container of the tub.

25. The motorcycle saddlebag of claim 24, wherein the one of the plurality of three dimensionally shaped fibrous material panels forming the one of the plurality of sidewalls comprises a vehicle attachment mount.

26. The motorcycle saddlebag of claim 22, further comprising a lid formed of at least one three dimensionally shaped panel comprised of a three dimensionally formed fibrous material layer made substantially completely of a fibrous material comprised substantially completely of the thermoplastic fibers bonded by a thermoplastic resin and wherein the at least one three dimensionally shaped fibrous material panel structurally supports the lid by substantially maintaining the three dimensional shape of the lid.

27. The motorcycle saddlebag of claim 26, wherein the fibrous material layer of the at least one fibrous material tub panel comprises a sound dampener that sound dampens the tub.

28. A motorcycle saddlebag comprised of a tub formed of a plurality of three dimensionally shaped panels each comprised of a thermally shaped and chill formed fibrous material layer whose three dimensional shape provides structural support thereto, with one of the three dimensionally shaped panels forming at least a plurality of walls of the tub and another one of the three dimensionally shaped panels forming at least one of the walls of the tub and comprises a base to which the one of the three dimensionally shaped panels is attached.

29. The motorcycle saddlebag of claim 28, wherein the fibrous material layer defines a sound absorbing layer that dampens transmission of sounds emanating from within the tub.

30. The motorcycle saddlebag of claim 28, wherein the fibrous material layer comprises a composite fiber layer formed substantially completely at least a plurality of different types of thermoplastic fibers.

* * * * *